Figure 1:
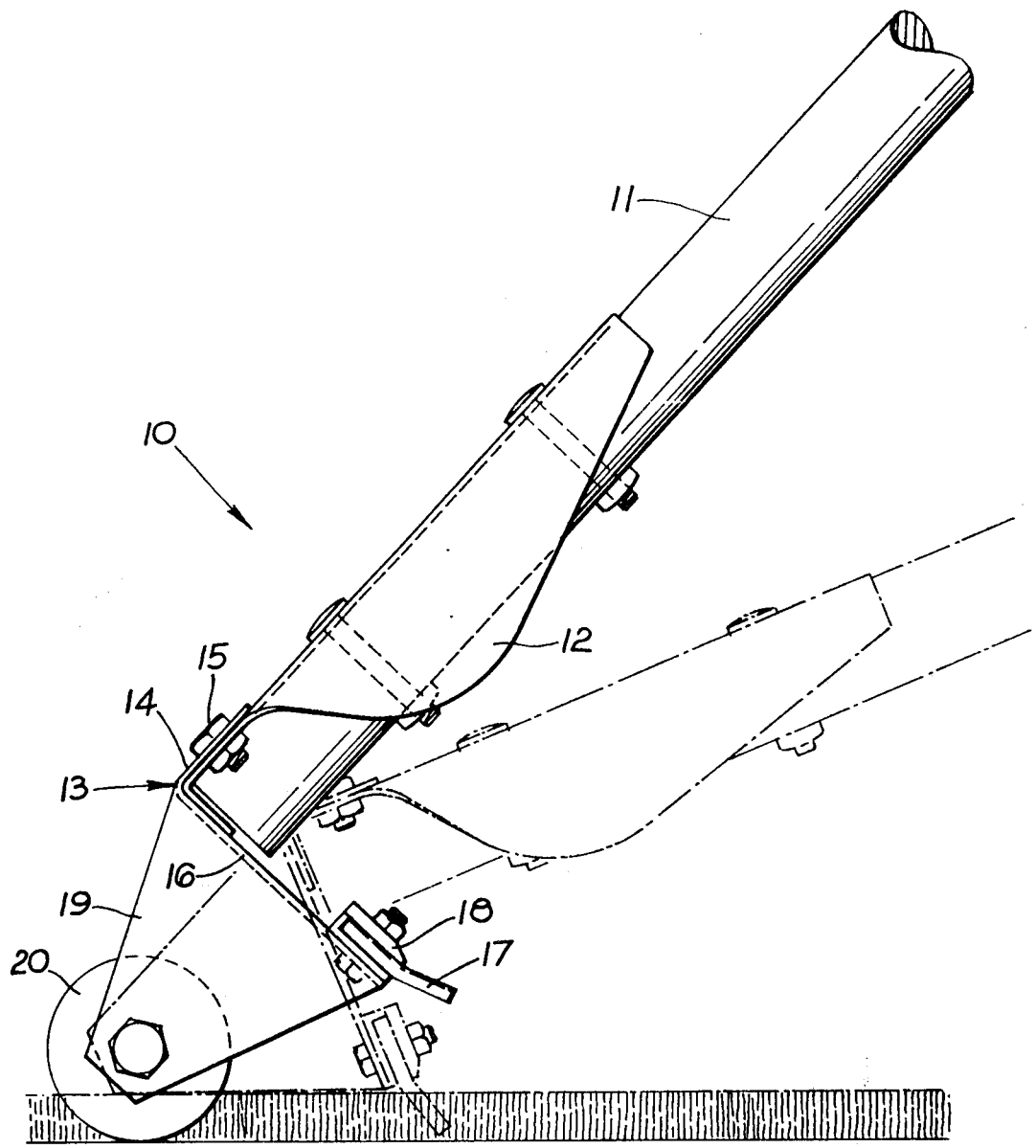

United States Patent [19]

Tansey

[11] 4,063,407
[45] Dec. 20, 1977

[54] RAKE

[76] Inventor: George Tansey, Midgehill Farm, Midgehill, Mossley, Lancashire, England

[21] Appl. No.: 703,122

[22] Filed: July 6, 1976

[51] Int. Cl.² .............................................. A01D 7/00
[52] U.S. Cl. ................................................. 56/400.14
[58] Field of Search ............ 56/400.01, 400.04–400.15

[56] References Cited
U.S. PATENT DOCUMENTS

| 834,914 | 11/1906 | Kruse et al. | 56/400.14 |
| 2,033,451 | 3/1936 | Rose | 56/400.14 X |
| 3,374,614 | 3/1968 | Dacheux, Jr. | 56/400.14 X |
| 3,495,388 | 2/1970 | Anesi | 56/400.14 |
| 3,678,670 | 7/1972 | Welz | 56/400.14 |

Primary Examiner—Russell R. Kinsey
Attorney, Agent, or Firm—Sherman Levy

[57] ABSTRACT

A rake has projections extending from the side of the tines remote from the handle, which projections can rest on a lawn and support the tines in a desired position relative to the lawn surface.

3 Claims, 2 Drawing Figures

RAKE

This invention relates to a rake, primarily for use in clearing cut grass from a lawn, of the type adapted to be pulled behind a user, i.e. in contradistinction to the type adapted to be pushed in front of a user.

When a lawn has been mown it is desirable to remove the cut grass therefrom. It is not possible to collect all grass cuttings in a grassbox of a mower and in the case of a mower working on the hover principle no grassbox is usually provided and all the cut grass has to be subsequently removed by raking.

Rakes heretofor used for raking lawns, by pulling them behind a user, have tended to be quite small, having cross-pieces between 12 and 18 inches wide, a wider cross-piece than this tending to be too unwieldy to handle satisfactorily.

It is an object of the present invention to provide a rake which can be larger than conventional lawn rakes without being unwieldy and which facilitates removal of cut grass from a lawn.

Accordingly, the invention provides a rake, of the type adapted to be drawn behind a user, comprising a cross-piece carrying a plurality of rigid tines, an elongate handle extending from one side of the cross-piece and at least two spaced apart projections extending from another side of the cross-piece so that with the projections in contact with the ground and the tines pointing downwards the handle can be disposed at a first angle to the ground with the free ends of the tines clear of the ground and at a second smaller angle with the free ends of the tines in grass raking disposition relative to the ground.

The projections are so positioned that the handle can be held at said second angle to the surface of a lawn with the projections resting on the lawn and the tines projecting downwardly from the blade a desired distance suitable to remove grass, etc., without tearing or cutting the lawn surface. By increasing the angle of the handle to the lawn to said first angle the tines can be raised clear of the grass and the rake pushed to a new position resting on the projections without the tines touching the lawn.

Preferably a projection is provided at each end of the blade and each is constituted by a plate mounting a wheel or roller for resting on a lawn. Alternatively each projection can comprise a plate having a surface capable of sliding on a lawn in the manner of a skid or runner.

In a preferred embodiment the cross-piece is three feet long (and can easily be handled without digging into a lawn) and has a plurality of short tines (½ an inch long at ½ inch spacing) extending from one side thereof.

Figure 2:
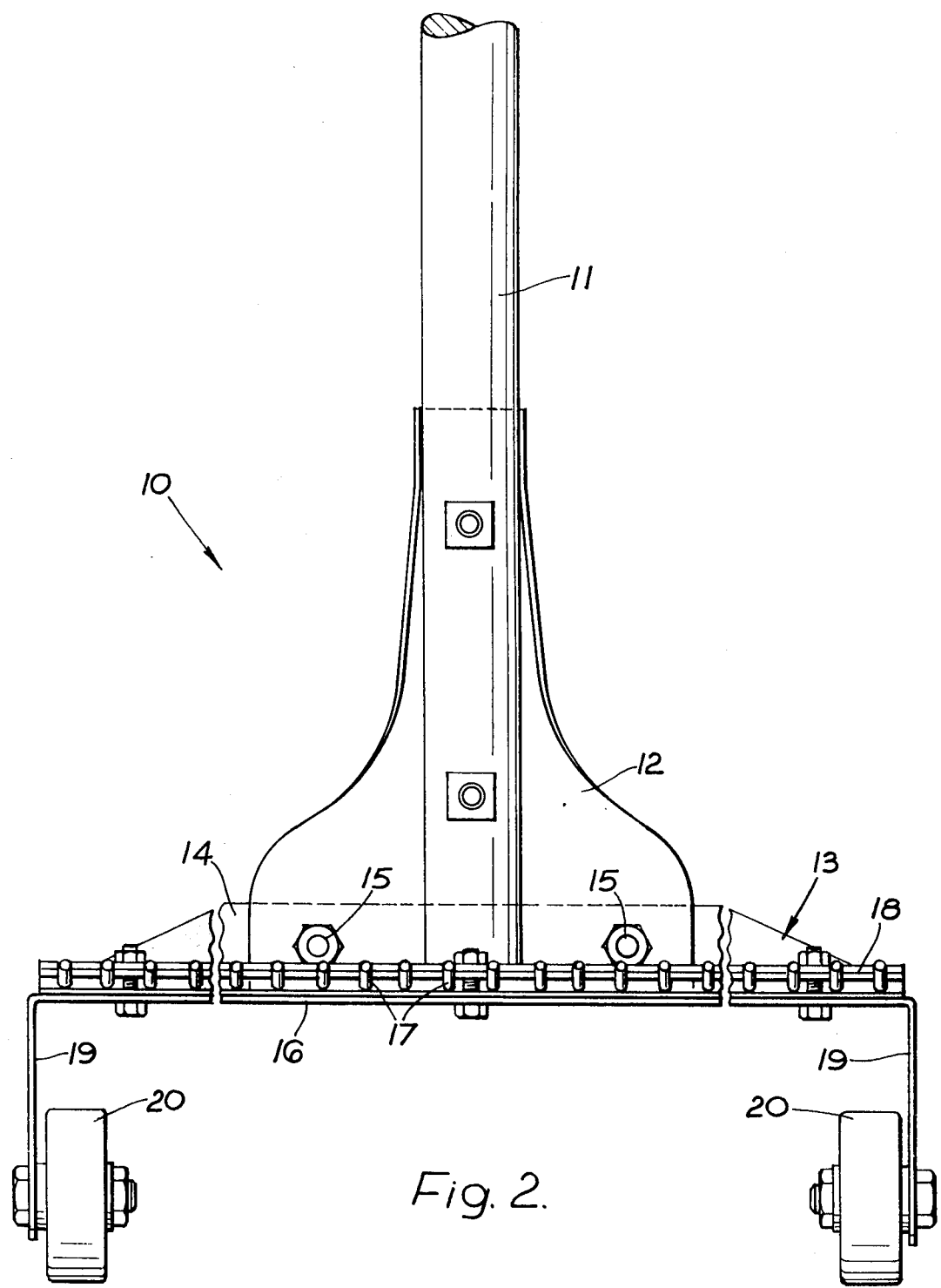

The invention will be described further, by way of example, with reference to the accompanying drawings, wherein:

FIG. 1 is a side elevation of a preferred embodiment, of rake conforming to the invention; and FIG. 2 is a front elevation of the rake of FIG. 1 when upright.

A preferred embodiment of rake 10 conforming to the invention and adapted to be drawn behind a user comprises a handle 11 in the form of a 6 or 7 foot length of one inch diameter wood fastened, at one end, to a bracket 12 that is connected to a cross-piece 13 of the rake 10. The cross-piece 13 is in the form of a 3 foot length of 1 inch by 2½ inch angle iron. The narrower flange 14 of the cross-piece 13 is attached to the bracket 12 by bolts 15 and the other flange 16 is directed at right angles away from the axis of the handle 11. The cross-piece 13 extends at right angles to the handle but can, if desired, extend any practicable angle thereto.

Secured to the wider flange 16, by a clamp bar 18, are a plurality of rigid tines 17 which project below the flange 16. Nuts and bolts, or screws, secure the clamp bar 18 to the flange 16. The tines 17 project ½ an inch from the flange 16 spaced at ½ inch intervals.

Projections extend from the end edges of the cross-piece 13 in the form of respective wheeled end portions of flange 19 integral with the flanges 16 of the angle iron, on the side of the cross-piece 13 remote from the handle.

Each projection mounts a wheel 20 mounted for rotation near its free end. Each wheel 20 is about 1½ inches in diameter.

The rake 10 of the invention is used to clear out grass from a cut lawn by placing the rake on the lawn with the tines projecting downwards and the wheels resting on the lawn. By choosing the angle the handle makes with the lawn by raising or lowering the handle the tines can be supported a desired distance accurately above the lawn and drawn towards the user to pull a swathe of cut grass towards him. The wheels 20 bear most of the weight of the rake and ensure that the long axis of the cross-piece lies transverse to the direction of travel and parallel to the lawn.

When the swathe of grass has been drawn to him the user can then raise the handle to increase its angle to the lawn, so raising the tines to separate collected grass therefrom, and then push the rake away from him on the wheels. He does not have to physically lift the full weight of the rake.

The invention is not limited to the precise details of the foregoing and variations can be made thereto.

For example the cross-piece of the rake can have any convenient width and projections can be provided at any desired practicable positions therealong. Each projection, instead of comprising a plate mounting a wheel, can comprise a plate having a surface, e.g. of nylon, capable of sliding on a lawn in the manner of a skid or runner.

The cross-piece can comprise an aluminium or plastics material or steel extruded section having slots or apertures for receiving the tines in the lower edge thereof. Many other variations are possible.

As can be seen from FIG. 1 the tines, in their working position, are inclined so as to project towards a user. This has the advantage that during the working stroke cut grass tends to slide up the tines and be retained thereby. If on the return stroke the tines are maintained in contact with the grass for a few inches the grass tends to brush out grass off the tines with a self cleaning action. The rake can, of course, be used for removing fallen leaves from a lawn.

I claim:

1. A rake structure comprising:
   an elongate handle;
   a tine carrier extending transversely of and secured to one end of said handle, said tine carrier being in the form of an angle-section length of metal, having a first flange and a second flange, said first flange serving for securement of said carrier to said handle;

a clamp bar extending parallel to a free edge portion of said second flange and sandwiching a plurality of tines between it and said second flange;

a portion of said second flange at each end of said tine carrier being extended beyond said first flange and bent forwardly to lie generally parallel to said handle on the side of the tine carrier remote from said handle; and a wheel mounted on each of said bent forward portions for rotation about an axis parallel to said tine carrier.

2. The structure as defined in claim 1, wherein the carrier consists of a piece of angle iron.

3. The structure as defined in claim 2, wherein the first flange of the carrier is more narrow than the second flange.

* * * * *